J. J. CROW.
COTTON CHOPPER.
APPLICATION FILED MAR. 4, 1910.
987,435.
Patented Mar. 21, 1911.
3 SHEETS—SHEET 1.
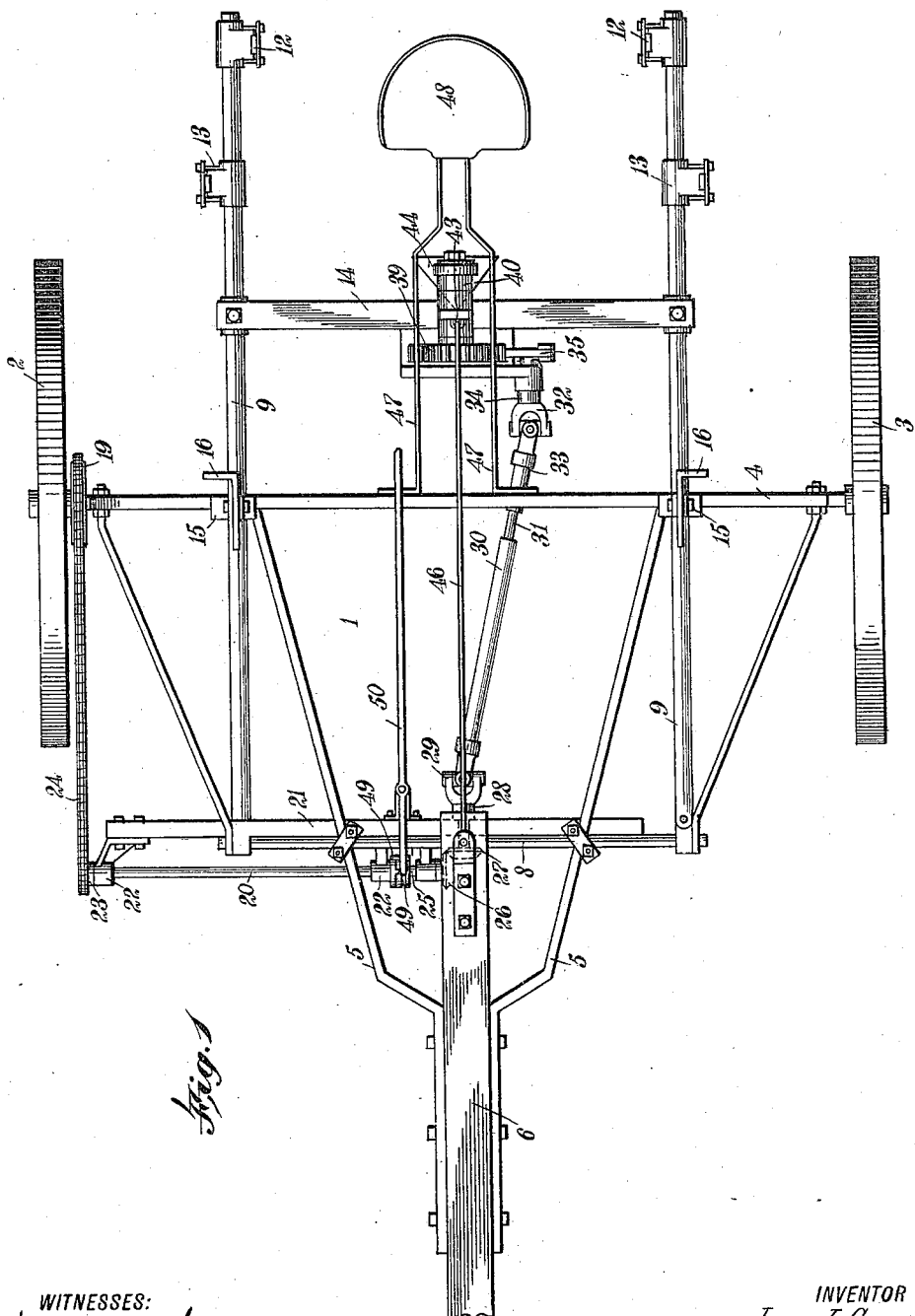
WITNESSES:
INVENTOR
Jesse J. Crow
BY
ATTORNEYS.

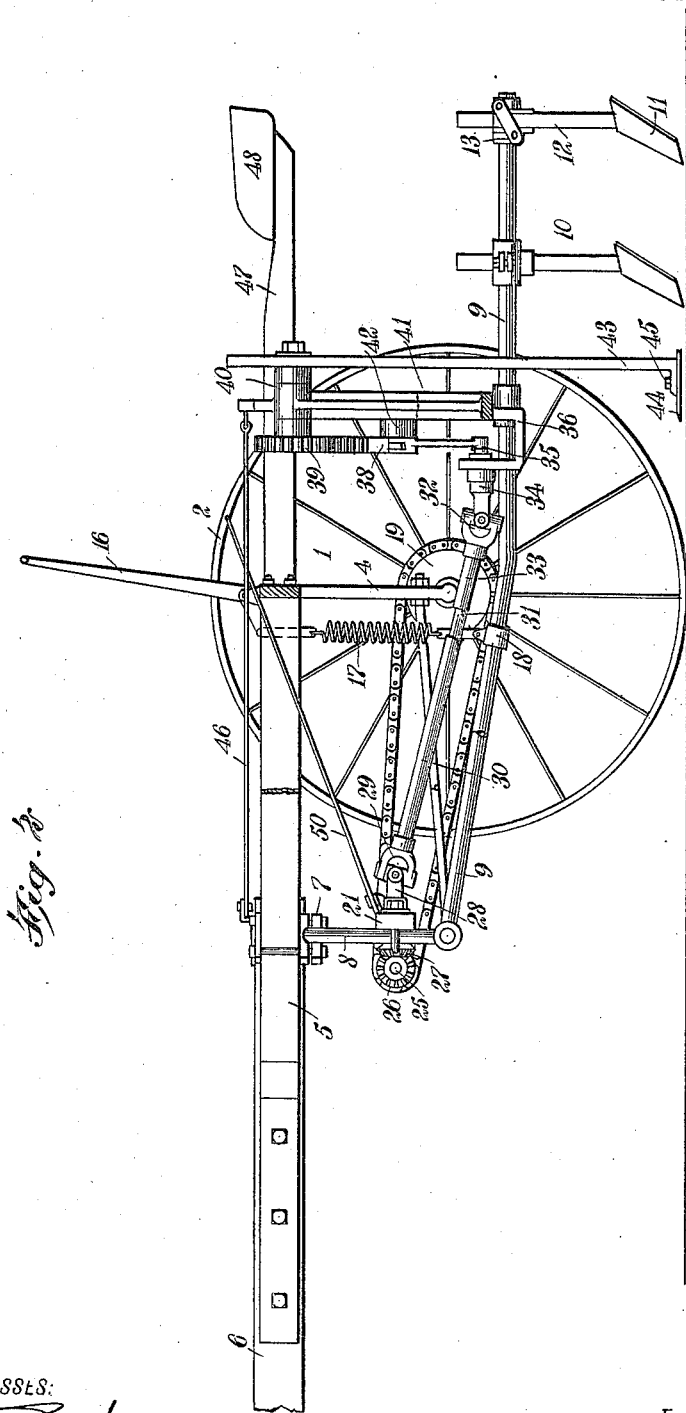

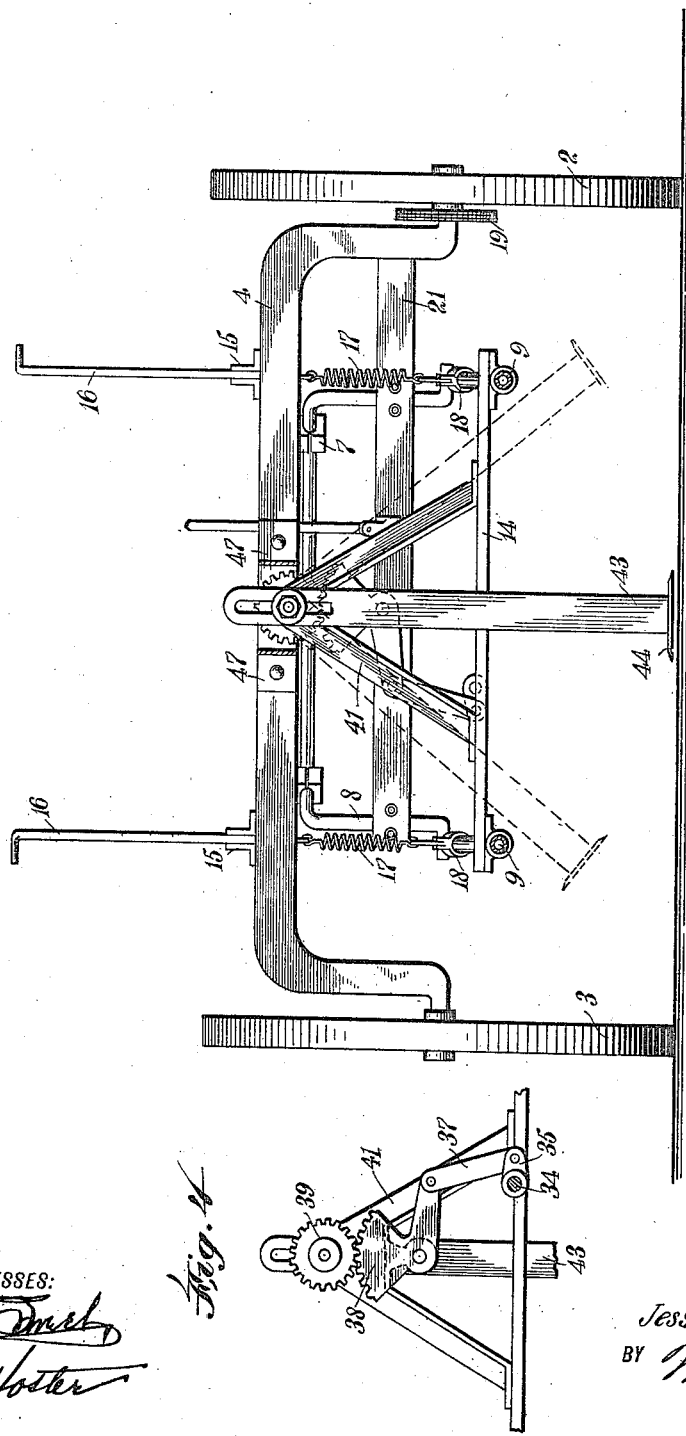

UNITED STATES PATENT OFFICE.

JESSE J. CROW, OF EL PASO COUNTY, TEXAS.

COTTON-CHOPPER.

987,435.

Specification of Letters Patent. Patented Mar. 21, 1911.

Application filed March 4, 1910. Serial No. 547,273.

*To all whom it may concern:*

Be it known that I, JESSE J. CROW, a citizen of the United States, and a resident of the county of El Paso, State of Texas, have invented a new and Improved Cotton-Chopper, of which the following is a full, clear, and exact description.

My invention relates to devices for cultivating and chopping cotton and like products, and provides a cotton chopper adapted to be used to cultivate the soil previous to planting cotton or the like, or my device can be readily used to chop down rows of cotton stalks or the like, the means for chopping off the stalks being adjustable so that the stalks can be severed at various distances above the ground.

My invention still further provides a chopper and cultivator provided with guides adapted to be moved vertically and horizontally, and having removably and adjustably secured thereon cultivating plows for cultivating soil preparatory to planting, and manually controlled means on the frame of the device for raising or lowering the said plows a convenient and practical distance from and into the soil.

A still further embodiment of my invention resides in a chopper and cultivator comprising a frame mounted on suitable traction wheels, the said frame having guides pivotally mounted thereon to move vertically or horizontally, and the said guides being provided with cultivating plows adjustably secured thereon. A chopping bar having a chopping knife is pivotally mounted on the said frame and adapted to swing, the said chopping bar being connected with driving means in engagement with one of the said traction wheels, so that the chopping bar will swing to and fro when the said traction wheel is turned.

My invention still further embodies certain novel features of construction as will be hereinafter more fully described and particularly set forth in the claims.

Reference is to be had to the accompanying drawings forming a part of this specification, in which similar characters of reference denote corresponding parts in all the views, and in which—

Figure 1 is a plan view of my chopper and cultivator; Fig. 2 is a fragmentary side elevation of my device showing various operating means; Fig. 3 is a rear elevation of my device, the dotted lines outlining the sweep of the chopping bar, and Fig. 4 is a front elevation of a portion of the means provided to swing the chopping bar back and forth.

Referring more particularly to the various views, I provide a frame 1, mounted on suitable traction wheels 2 and 3 connected by an inverted U-shaped axle 4. Suitable braces 5, 5 are secured to the frame 1 and project forwardly to engage a shaft 6 to which suitable draft animals can be attached for pulling the device. To the under side of the shaft 6 is secured by means of bearings 7, an inverted U-shaped hanger 8. Pivotally mounted on both ends of the hanger 8 are rearwardly extending guides 9 having removably and adjustably secured to their respective end portions similar cultivating plows 10, consisting of an angular spade 11 and a handle 12 held in bearings 13 secured to the guides 9. A cross brace 14 is provided secured to the guides 9 to keep the same equidistantly spaced apart and act as a strengthening member. Movably mounted on both sides of the axle 4 by means of bearings 15 are similar adjusting manually controlled levers 16, and secured to the lower ends of the levers 16 are springs 17 connected to the guides 9 by suitable clamps 18. By the use of the levers 16 the guides 9 can be raised or lowered at the will of the operator.

On the inner side of the traction wheel 2 is secured a sprocket wheel 19. A driving shaft 20 is mounted on a brace 21 of the frame 1 by means of bearings 22, and secured to one end of the shaft 20 is a sprocket wheel 23, over which is passed a chain 24, the said chain 24 also passing over the sprocket wheel 19. On another shaft 25 adjacent the shaft 20 is mounted a bevel gear 26 in mesh with a second bevel gear 27 secured to a shaft 28 provided with a universal joint 29. Secured to an end of the universal joint 29 is a hollow shaft 30 having slidably secured therein a second shaft 31, as will be clearly seen by referring to Fig. 1. The telescoping feature of the shafts 30—31 and the necessity therefor is to provide for the varying distances in plow beams, from the point where the bar 8 is attached to the point where the bar 14 is adapted to be attached. A second universal joint 32 is secured to a shaft 33 to which is fastened the shaft 31 and the other end of the universal joint 32 engages a crank shaft 34 provided with a crank 35 mounted on a suitable bearing 36.

A pitman 37 connects the crank 35 with a segmental toothed gear 38 which in turn engages a toothed wheel or gear 39 mounted on a bearing 40 of a standard 41, and the pivot member of the segmental gear 38 is also mounted in a bearing 42 of the standard 41. The standard 41 derives its support from the plow beams and when the plows are in the ground, the standard rests on the beams and they being on the plows, the standard is directly supported from the ground. The toothed gear 39 is connected with a chopping bar 43 by a suitable connecting member passed through the bearing 40. The chopping bar 43 is provided at the upper end with a slot and through the said slot is passed the shaft of the gear 39 thereby permitting of easily and readily adjusting the chopping bar 43 to various distances from the ground. On the lower end of the chopping bar 43 is secured a chopping knife 44, preferably triangularly shaped and secured to the chopping bar 43 by a nut 45 screw-threaded to a suitable bolt on the chopping knife 44.

A rod 46 is provided secured to the standard 41 and the shaft 6, and more securely holds and strengthens the standard 41. Secured to the axle 4 are rearwardly extending braces 47 having secured to their outer ends a seat 48 for the reception of an operator. On the shaft 20 intermediate the bearings 22 and the bevel gear 25 are arranged clutch members 49 provided with and operated by a suitable lever 50. When the lever 50 is operated to move the same to the right, the shaft 25 and the shaft 20 are disconnected and the chopping bar 43 and parts connected thereto remain inoperative. When the lever 50 is operated to move the same to the left, the shaft 25 and the shaft 20 are directly connected and the chopping bar 43 and parts connected therewith are operative. Thus, when the vehicle is moved, the traction wheel 2 is turned and by the various driving members heretofore described, the chopping bar 43 is operated to oscillate as shown by the dotted lines in Fig. 3. The device is now being used as a chopper and the knife secured to the oscillating chopping bar 43 chops off the rows of stalks at a distance from the ground regulated by the adjustable means on the upper portion of the chopping bar.

To operate the vehicle described, as a cultivator, the lever 50 is moved to the right, thereby preventing the chopping bar 43 from operating, and the operator seated in the seat 48, by placing his feet on the guides 9, can swing the same horizontally in either direction as the vehicle is moved along, and the plows 10 engaging the soil, cultivate it in the same manner as any regular cultivator, but the swinging guides 9 enable a far greater territory to be covered at one time than is covered by the regular cultivator. By pressing down on the guides 9 the operator can easily regulate the depth of the plows in the soil, and when it is desired to dispense with both the plows and the chopping device, the lever 50 is operated so as to prevent any transmission of power from the traction wheel 2 to the chopping bar 43, and the lever 16 on the frame 1 is operated to exert an upward pull on the guides 9, thereby raising the plows 10 clear of the ground. In this manner the vehicle can be conveniently used in driving to or from the field to be cultivated or chopped, as both the chopping device and cultivating device are inactive. Should the operator at any time desire to chop down certain stalks and cultivate the soil at the same time, the same can be easily performed with the vehicle described.

Although I have shown and described my cultivator and chopper as applied more particularly to the cultivation of cotton, it will be readily understood that the device can be used for the cultivation of fields in which various products are grown. It will be still further understood that I do not limit myself to the precise construction shown and described, the scope of my invention being clearly defined and outlined in the appended claims; and it will be still further understood that the two wheels upon which the frame is mounted can be adapted to operate the chopper bar in preference to one wheel as shown in the drawings; and that instead of employing two levers 16, as shown in the drawings, one lever can be used to obtain the same result derived from the use of two levers.

Having thus described my invention, I claim as new and desire to secure by Letters Patent:

1. A device of the class described, comprising a frame mounted on wheels, a chopping bar mounted to swing on the frame, geared means mounted on the frame and engaging the chopping bar to operate the same, an offset shaft connected with the geared means by a crank and driving means engaging the shaft.

2. A device of the class described, comprising a frame, a chopping bar mounted to swing thereon, geared means on the frame and engaging the chopping bar, a crank connected with the geared means, a telescoping shaft connected with the crank and mounted on the frame and driving means on the frame and engaging the shaft to operate the said chopping bar.

In testimony whereof I have signed my name to this specification in the presence of two subscribing witnesses.

JESSE J. CROW.

Witnesses:
I. P. TREADWELL,
PEARL PATTERSON.

Copies of this patent may be obtained for five cents each, by addressing the "Commissioner of Patents, Washington, D. C."